United States Patent
Li et al.

(10) Patent No.: US 11,604,349 B2
(45) Date of Patent: Mar. 14, 2023

(54) SHORT-DISTANCE OPTICAL AMPLIFICATION MODULE, AMPLIFICATION METHOD AND AMPLIFICATION SYSTEM

(71) Applicant: SHENZHEN DLODLO NEW TECHNOLOGY CO., LTD., Guangdong (CN)

(72) Inventors: Gang Li, Shenzhen (CN); Weiping Tang, Shenzhen (CN)

(73) Assignee: SHENZHEN DLODLO NEW TECHNOLOGY CO., LTD., Shenzhen (CN)

( * ) Notice: Subject to any disclaimer, the term of this patent is extended or adjusted under 35 U.S.C. 154(b) by 476 days.

(21) Appl. No.: 16/073,415

(22) PCT Filed: Jan. 28, 2016

(86) PCT No.: PCT/CN2016/072532
§ 371 (c)(1),
(2) Date: Jul. 27, 2018

(87) PCT Pub. No.: WO2017/128187
PCT Pub. Date: Aug. 3, 2017

(65) Prior Publication Data
US 2019/0033581 A1   Jan. 31, 2019

(51) Int. Cl.
*G02B 27/28*   (2006.01)
*G02B 27/00*   (2006.01)
(Continued)

(52) U.S. Cl.
CPC ..... *G02B 27/0025* (2013.01); *G02B 27/0172* (2013.01); *G02B 27/286* (2013.01); *G02B 5/3083* (2013.01)

(58) Field of Classification Search
CPC ....... G02B 5/30; G02B 5/3083; G02B 27/286
(Continued)

(56) References Cited

U.S. PATENT DOCUMENTS 5,715,023 A   2/1998   Hoppe
5,966,242 A * 10/1999   Yamanaka ......... G02B 27/0172
                                                                359/618
(Continued)

FOREIGN PATENT DOCUMENTS

CN   1316063 A   10/2001
CN   1388909 A    1/2003
(Continued)

OTHER PUBLICATIONS

International Search Report for PCT/CN2016/072532, ISA/CN, Haidian District, Beijing, dated Jul. 26, 2016.
(Continued)

*Primary Examiner* — Ricky D Shafer
(74) *Attorney, Agent, or Firm* — Harness, Dickey & Pierce, P.L.C.

(57) ABSTRACT

Disclosed are a short-distance optical amplification module, method and system. The module comprises a reflective type polarizing plate, a first phase delay plate, an imaging lens, a second phase delay plate and an absorptive type polarizing plate, arranged successively. The reflective type polarizing plate is arranged on a transmission path of an optical image. The first phase delay plate is arranged on the transmission path of the optical image passing through the reflective delay plate. The imaging lens is arranged on the transmission path of the optical image. The second phase delay plate is configured for converting a polarization direction of the optical image from an elliptical or circular polarization direction to a second linear polarization direction. The absorptive type polarizing plate is arranged on one side of
(Continued)

the second phase delay plate that faces away from the imaging lens.

12 Claims, 7 Drawing Sheets

(51) Int. Cl.
  *G02B 27/01* (2006.01)
  *G02B 5/30* (2006.01)
(58) Field of Classification Search
  USPC .............................................. 359/485.1, 900
  See application file for complete search history.

(56) References Cited

U.S. PATENT DOCUMENTS

| | | | | |
|---|---|---|---|---|
| 6,075,651 | A * | 6/2000 | Hoppe | G02B 27/0172 359/15 |
| 6,094,242 | A | 7/2000 | Yamanaka | |
| 6,262,841 | B1 | 7/2001 | Dike | |
| 6,266,194 | B1 | 7/2001 | Tanijiri et al. | |
| 6,304,303 | B1 | 10/2001 | Yamanaka | |
| 6,421,183 | B1 * | 7/2002 | Ophey | G02B 27/0172 359/630 |
| 8,305,690 | B2 * | 11/2012 | Ruhle | G02B 5/3016 359/630 |
| 9,690,097 | B2 * | 6/2017 | Tang | G02B 27/0101 |
| 9,759,915 | B2 * | 9/2017 | Tang | G02B 27/0101 |
| 9,933,627 | B2 | 4/2018 | Iwane | |
| 10,197,802 | B2 * | 2/2019 | Hoppe | G02B 27/0149 |
| 2002/0057498 | A1 | 5/2002 | Kobayashi et al. | |
| 2005/0111101 | A1 * | 5/2005 | Dike | G02B 27/0101 359/489.07 |
| 2007/0273970 | A1 * | 11/2007 | Hoppe | G02B 27/28 359/489.07 |
| 2012/0287504 | A1 | 11/2012 | Jang et al. | |
| 2016/0077351 | A1 | 3/2016 | Iwane | |
| 2017/0017077 | A1 | 1/2017 | Tang et al. | |
| 2017/0017078 | A1 | 1/2017 | Tang et al. | |
| 2018/0149880 | A1 | 5/2018 | Iwane | |

FOREIGN PATENT DOCUMENTS

| | | |
|---|---|---|
| CN | 1930511 A | 3/2007 |
| CN | 105093555 A | 11/2015 |
| EP | 0718645 A2 | 6/1996 |
| EP | 0803756 A1 | 10/1997 |
| EP | 1357417 A2 | 10/2003 |
| JP | H08327940 A | 12/1996 |
| JP | H1010465 A | 1/1998 |
| JP | 2000249984 A | 9/2000 |
| KR | 20120126561 A | 11/2012 |
| WO | WO-2014129630 A1 | 8/2014 |

OTHER PUBLICATIONS

Written Opinion of the ISA for PCT/CN2016/072532, ISA/CN, Haidian District, Beijing, dated Jul. 26, 2016.
Extended European Search Report regarding Application No. 16887074.9 dated Aug. 16, 2019.
European Office Action regarding Application No. 16887074.9 dated Oct. 7, 2020.

* cited by examiner

SHORT-DISTANCE OPTICAL AMPLIFICATION MODULE, AMPLIFICATION METHOD AND AMPLIFICATION SYSTEM

CROSS-REFERENCE TO RELATED APPLICATION

This application is a 371 U.S. National Stage of International Application No. PCT/CN2016/072532, filed Jan. 28, 2016. The disclosures of the above application are incorporated herein by reference.

FIELD OF THE INVENTION

The present invention relates to the field of optical module design technologies, and in particular, to a short-distance optical amplification module, a short-distance optical amplification method and a short-distance optical amplification system.

BACKGROUND OF THE INVENTION

Figure 2:
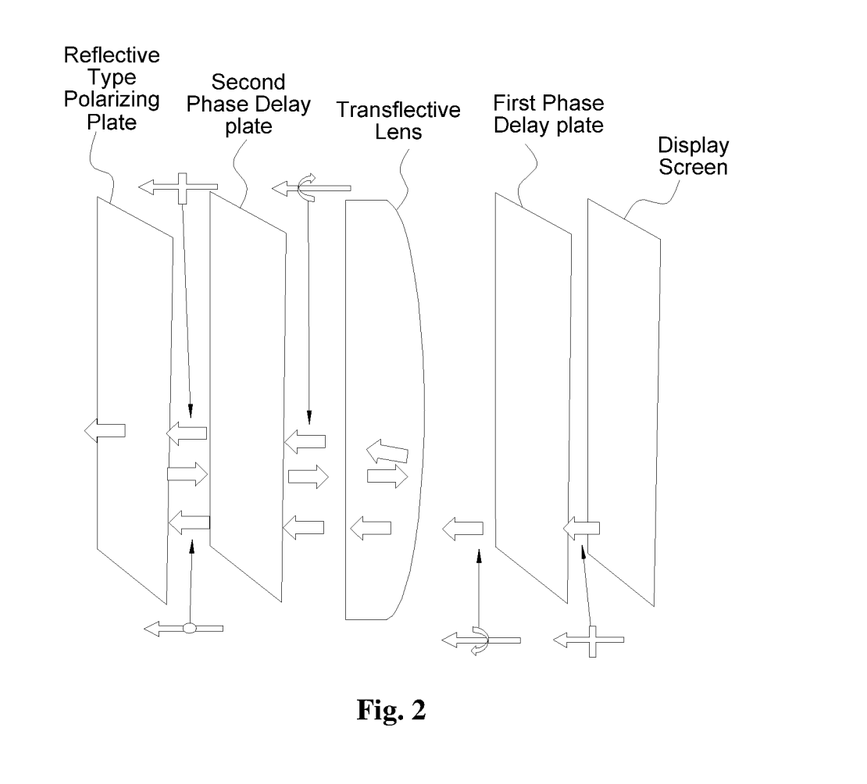
FIG. 2 is a structural representation of an existing short-distance optical amplification module.

The structure of an existing short-distance optical amplification module, as shown in FIG. 2, includes a display screen, a first phase delay plate, a transflective lens, a second phase delay plate and a reflective type polarizing plate. In the module, in order to amplify optical path, light is first transmitted through a transflective curved lens from one side of the first phase delay plate and then reflected by the reflective type polarizing plate. As a result, chromatic dispersion will occur to the light during transmission, the dispersed light will cause light loss, and hence the quality of light reflection imaging will be affected, and it is difficult to meet the quality requirement of high definition.

SUMMARY OF THE INVENTION

Embodiments of the invention provide a short-distance optical amplification module, a short-distance optical amplification method and a short-distance optical amplification system, thereby solving the problem of an existing short-distance optical amplification module that the imaging quality of an optical image is affected due to chromatic dispersion during light transmission.

In order to solve the above technical problem, embodiments of the invention disclose the following technical solutions.

A short-distance optical amplification module, which comprises: a reflective type polarizing plate, a first phase delay plate, an imaging lens, a second phase delay plate and an absorptive type polarizing plate that are arranged successively, wherein:

the reflective type polarizing plate is arranged on a transmission path of an optical image having a first linear polarization direction and has a transmission direction consistent with the first linear polarization direction;

the first phase delay plate is arranged on the transmission path of the optical image passing through the reflective type polarizing plate and configured for converting the polarization direction of the optical image from the first linear polarization direction to an elliptical or circular polarization direction;

the imaging lens is arranged on the transmission path of the optical image having the elliptical or circular polarization direction and comprises a second optical surface adjacent to the first phase delay plate and a first optical surface opposite to the second optical surface, the first optical surface being a transflective optical surface, and is configured for amplifying an optical image passing through the first optical surface;

the second phase delay plate is arranged on one side of the first optical surface of the imaging lens and configured for converting the polarization direction of the optical image from the elliptical or circular polarization direction to a second linear polarization direction, the second linear polarization direction being orthogonal to the first linear polarization direction; and the absorptive type polarizing plate is arranged on one side of the second phase delay plate that faces away from the imaging lens and has a transmission direction consistent with the first linear polarization direction;

wherein, the optical image successively passes through the reflective type polarizing plate, the first phase delay plate, the imaging lens, the second phase delay plate and the absorptive type polarizing plate, and the first phase delay plate is further configured for converting the polarization direction of the optical image reflected by the imaging lens from the elliptical or circular polarization direction to a second linear polarization direction, the reflective type polarizing plate is configured for reflecting the optical image having the second linear polarization direction transmitted by the first phase delay plate, the imaging lens is configured for amplifying the optical image reflected by the reflective type polarizing plate, and the second phase delay plate is further configured for converting the polarization direction of the amplified optical image to a non-second linear polarization direction, thereby passing the optical image having the non-second linear polarization direction through the absorptive type polarizing plate.

Preferably, the first phase delay plate and the second phase delay plate are both ¼ wave plates.

Preferably, the second optical surface of the imaging lens is adhered to the first phase delay plate, and the second phase delay plate is adhered to the absorptive type polarizing plate.

Preferably, the first optical surface of the imaging lens is adhered to the second phase delay plate.

Preferably, the reflective type polarizing plate is adhered to the first phase delay plate.

Preferably, the module further comprises an optical display screen configured for generating an optical image having a first linear polarization direction, which is arranged on one side of the reflective type polarizing plate that faces away from the first phase delay plate.

A short-distance optical amplification module, which comprises a reflective type polarizing plate, a first phase delay plate, an imaging lens, a second phase delay plate and an absorptive type polarizing plate that are arranged successively, wherein:

the reflective type polarizing plate is arranged on a transmission path of an optical image having a first linear polarization direction and has a transmission direction consistent with the first linear polarization direction;

the first phase delay plate is arranged on the transmission path of the optical image passing through the reflective type polarizing plate and configured for converting the polarization direction of the optical image from the first linear polarization direction to an elliptical or circular polarization direction;

the imaging lens is arranged on the transmission path of the optical image having the elliptical or circular polarization direction and comprises a second optical surface adjacent to the first phase delay plate and a first optical surface opposite to the second optical surface, the first optical surface being a transflective optical surface, and the imaging lens is configured for amplifying an optical image passing through the first optical surface;

the second phase delay plate is arranged on one side of the first optical surface of the imaging lens and configured for converting the polarization direction of the optical image from the elliptical or circular polarization direction to the first linear polarization direction; and the absorptive type polarizing plate is arranged on one side of the second phase delay plate that faces away from the imaging lens and has a transmission direction consistent with a second linear polarization direction, the second linear polarization direction being orthogonal to the first linear polarization direction;

wherein, the optical image successively passes through the reflective type polarizing plate, the first phase delay plate, the imaging lens, the second phase delay plate and the absorptive type polarizing plate, and the first phase delay plate is further configured for converting the polarization direction of the optical image reflected by the imaging lens from the elliptical or circular polarization direction to a second linear polarization direction; the reflective type polarizing plate is configured for reflecting the optical image having the second linear polarization direction transmitted by the first phase delay plate, the imaging lens is configured for amplifying the optical image reflected by the reflective type polarizing plate, and the second phase delay plate is further configured for converting the polarization direction of the amplified optical image to a non-first linear polarization direction, thereby passing the optical image having the non-first linear polarization direction through the absorptive type polarizing plate.

A short-distance optical amplification method, which comprises the following steps:

outputting an optical image having a first linear polarization direction along a transmission path, and passing the optical image having the first linear polarization direction through a reflective type polarizing plate, wherein the reflective type polarizing plate has a transmission direction consistent with the first linear polarization direction;

converting the polarization direction of the optical image from the first linear polarization direction to an elliptical or circular polarization direction, and reflecting and amplifying the optical image via an imaging lens;

converting the polarization direction of the optical image reflected by the imaging lens from the first linear polarization direction to a second linear polarization direction, the second linear polarization direction being orthogonal to the first linear polarization direction;

reflecting the optical image having the second linear polarization direction by the reflective type polarizing plate, and converting the polarization direction of the optical image from the second linear polarization direction to an elliptical or circular polarization direction; and transmitting and amplifying, via the imaging lens, the optical image reflected by the reflective type polarizing plate, converting the polarization direction of the transmitted and amplified optical image from the elliptical or circular polarization direction to a non-second linear polarization direction, and passing the optical image having the non-second linear polarization direction through the absorptive type polarizing plate.

A short-distance optical amplification method, which comprises the following steps:

outputting an optical image having a first linear polarization direction along a transmission path, and passing the optical image having the first linear polarization direction through a reflective type polarizing plate, wherein the reflective type polarizing plate has a transmission direction consistent with the first linear polarization direction;

converting the polarization direction of the optical image from the first linear polarization direction to an elliptical or circular polarization direction, and reflecting and amplifying the optical image via an imaging lens;

converting the polarization direction of the optical image reflected by the imaging lens from the first linear polarization direction to a second linear polarization direction, the second linear polarization direction being orthogonal to the first linear polarization direction;

reflecting the optical image having the second linear polarization direction by the reflective type polarizing plate, and converting the polarization direction of the optical image from the second linear polarization direction to an elliptical or circular polarization direction; and transmitting and amplifying, via the imaging lens, the optical image reflected by the reflective type polarizing plate, converting the polarization direction of the transmitted and amplified optical image from the elliptical or circular polarization direction to a non-first linear polarization direction, and passing the optical image having the non-first linear polarization direction through the absorptive type polarizing plate.

A short-distance optical amplification system, which comprises a short-distance optical amplification module, and an optical display screen configured for generating an optical image having a first linear polarization direction, wherein, the short-distance optical amplification module comprises:

a reflective polarization layer, which is arranged on a transmission path of an optical image having a first linear polarization direction and has a transmission direction consistent with the first linear polarization direction;

a first phase delay layer, which is arranged on the transmission path of the optical image passing through the reflective polarization layer and configured for converting the polarization direction of the optical image from the first linear polarization direction to an elliptical or circular polarization direction;

an imaging lens layer, which is arranged on the transmission path of the optical image having the elliptical or circular polarization direction and comprises a second optical surface adjacent to the first phase delay layer and a first optical surface opposite to the second optical surface, the first optical surface being a transflective optical surface, and is configured for amplifying an optical image passing through the first optical surface;

a second phase delay layer, which is arranged on one side of the first optical surface of the imaging lens layer and configured for converting the polarization direction of the optical image from the elliptical or circular polarization direction to a second linear polarization direction, the second linear polarization direction being orthogonal to the first linear polarization direction; and an absorptive polarization layer, which is arranged on one side of the second phase delay layer that faces away from the imaging lens layer and has a transmission direction consistent with the first linear polarization direction;

wherein, the optical image successively passes through the reflective polarization layer, the first phase delay layer, the imaging lens layer, the second phase delay layer and the absorptive polarization layer, and the first phase delay layer is further configured for converting the polarization direction of the optical image reflected by the imaging lens layer from the elliptical or circular polarization direction to a second linear polarization direction, the reflective polarization layer is configured for reflecting the optical image having the second linear polarization direction that is transmitted by the first phase delay layer, the imaging lens layer is configured for reflecting and amplifying the optical image reflected by the reflective polarization layer, and the second phase delay layer is further configured for converting the polarization direction of the amplified optical image to a non-second linear polarization direction, thereby passing the optical image having the non-second linear polarization direction through the absorptive polarization layer.

A short-distance optical amplification system, which comprises a short-distance optical amplification module, and an optical display screen configured for generating an optical image having a first linear polarization direction, wherein, the short-distance optical amplification module comprises:

a reflective polarization layer, which is arranged on a transmission path of an optical image having a first linear polarization direction and has a transmission direction consistent with the first linear polarization direction;

a first phase delay layer, which is arranged on the transmission path of the optical image passing through the reflective polarization layer and configured for converting the polarization direction of the optical image from the first linear polarization direction to an elliptical or circular polarization direction;

an imaging lens layer, which is arranged on the transmission path of the optical image having the elliptical or circular polarization direction and comprises a second optical surface adjacent to the first phase delay layer and a first optical surface opposite to the second optical surface, the first optical surface being a transflective optical surface, and is configured for amplifying an optical image passing through the first optical surface;

a second phase delay layer, which is arranged on one side of the first optical surface of the imaging lens layer and configured for converting the polarization direction of the optical image from the elliptical or circular polarization direction to the first linear polarization direction; and an absorptive polarization layer, which is arranged on one side of the second phase delay layer that faces away from the imaging lens layer and has a transmission direction consistent with a second linear polarization direction, the second linear polarization direction being orthogonal to the first linear polarization direction;

wherein, the optical image successively passes through the reflective polarization layer, the first phase delay layer, the imaging lens layer, the second phase delay layer and the absorptive polarization layer, and the first phase delay layer is further configured for converting the polarization direction of the optical image reflected by the imaging lens layer from the elliptical or circular polarization direction to a second linear polarization direction, the reflective polarization layer is configured for reflecting the optical image having the second linear polarization direction that is transmitted by the first phase delay layer, the imaging lens layer is configured for reflecting and amplifying the optical image reflected by the reflective polarization layer, and the second phase delay layer is further configured for converting the polarization direction of the amplified optical image to a non-first linear polarization direction, thereby passing the optical image having the non-first linear polarization direction through the absorptive polarization layer.

Preferably, the system further comprises an optical device that does not affect phase delay, wherein the optical device is arranged between the short-distance optical amplification module and the optical display screen.

Preferably, the short-distance optical amplification module further comprises an optical device layer that does not affect phase delay, wherein the optical device layer is arranged between any two of the reflective polarization layer, the first phase delay layer, the imaging lens layer, the second phase delay layer and the absorptive polarization layer.

A short-distance optical amplification module, which comprises a reflective type polarizing plate, an imaging lens and an absorptive type polarizing plate that are arranged successively, wherein, the reflective type polarizing plate comprises a first side and a second side opposite to the first side, the first side transmits light, and the second side reflects light, and the second side is adjacent to the imaging lens, wherein one of the two sides of the imaging lens is a flat surface part, and the other of the two sides opposite to the flat surface part is a curved surface part, and the side of the curved surface part is adjacent to the absorptive type polarizing plate.

It may be seen from the above technical solutions that the invention has the beneficial effects below:

In the short-distance optical amplification module according to this technical solution, the reflective type polarizing plate is adjacent to the light source side, a polarized light is reflected for the first time on the imaging lens after passing through the first phase delay plate, the polarized light reflected is reflected for the second time on the reflective type polarizing plate after passing through the first phase delay plate again, the light after being reflected for the second time is then refracted by the imaging lens, and the polarized light refracted enters the sight of a viewer after passing through the second phase delay plate. By the short-distance optical amplification module according to the invention, light is reflected first and refracted finally, and because there is no light loss in the reflection, a light loss resulting from chromatic dispersion of refracted light caused by first refraction and then reflection in an existing short-distance optical amplification module may be avoided, thereby preventing the imaging quality of the light from being affected. Therefore, light may be prevented from returning to the optical display screen, light loss may be lowered, and light utilization and imaging quality may be improved.

In the short-distance optical amplification module according to this technical solution, one side of the imaging lens is the second optical surface, and it is convenient for the second optical surface of the imaging lens to be adhered to the first phase delay plate, thereby reducing the size and volume of the optical module. Additionally, the second optical surface of the imaging lens can further reduce the degree of chromatic dispersion on the curved surface and guarantee the quality of light transmission. In comparison with the first optical surface, the mirror finishing process and process difficulty of the second optical surface will be lower, and the manufacturing cost will be smaller.

Additionally, the second phase delay plate is adhered to the absorptive type polarizing plate, the imaging lens is adhered to the second phase delay plate, and the reflective type polarizing plate is adhered to the first phase delay plate, thus the spatial distance of the three sets of components may be reduced, and the size and volume of the short-distance optical amplification module may be further decreased.

The short-distance optical amplification module according to the technical solutions of the invention further comprises an optical display screen, by which the short-distance optical amplification module can realize optical imaging. When the short-distance optical amplification module is applied to virtual reality (VR) glasses, the size and volume of the VR glasses will be smaller in comparison with the existing VR glasses, and the weight will be lighter.

The short-distance optical amplification module according to the technical solutions of the invention further comprises an optical device that does not affect phase delay. The optical device brings practicability and flexibility of the optical amplification module, so that the short-distance optical amplification module according to the invention can be applicable to different optical devices and apparatuses. Additionally, the optical device may be arranged between any two adjacent components without affecting the phase delay of the optical path, and hence the practicability and flexibility of the module according to this solution may be further improved.

In the short-distance optical amplification method according to the technical solutions of the invention, by employing a short-distance optical amplification module, an optical image is reflected first and refracted finally, thus a light loss resulting from chromatic dispersion of refracted light caused by first refraction and then reflection in an existing short-distance optical amplification module may be avoided, thereby preventing the imaging quality of the light from being affected.

The solutions of the invention further provides a short-distance optical amplification system, which comprises a short-distance optical amplification module and an optical display screen, wherein, the short-distance optical amplification module is an multilayer optical module consisted of a reflective polarization layer, a first phase delay layer, an imaging lens layer, a second phase delay layer and an absorptive polarization layer, so that the size and volume of the optical module may be reduced to the maximum extent without affecting the optical imaging quality, the weight may be reduced, and the comfortableness of wearing VR glasses employing the optical amplification system is improved.

Another short-distance optical amplification system according to the technical solutions of the invention further comprises an optical device that does not affect phase delay, and the position of the optical device may be arranged freely, thus the practicability of the short-distance optical amplification system may be further improved.

BRIEF DESCRIPTION OF THE DRAWINGS

In order to more clearly illustrate the technical solutions of the embodiments of the invention or of the prior art, the drawings needed in the description of the embodiments or the prior art will be briefly introduced below. Apparently, the drawings in the description below are only some embodiments of the invention, and other drawings may also be obtained by one of ordinary skills in the art according to these drawings without creative work.

DETAILED DESCRIPTION OF THE EMBODIMENTS

For one skilled in the art to better understand the technical solutions of the invention, the technical solutions in the embodiments of the invention will be described clearly and fully below in conjunction with the drawings in the embodiments of the invention. Apparently, the embodiments described are only a part of the embodiments of the invention, rather than being the whole embodiments. All the other embodiments obtained by one of ordinary skills in the art based on the embodiments of the invention without creative work will pertain to the protection scope of the invention.

A short-distance optical amplification module, a short-distance optical amplification method and a short-distance optical amplification system will be described in detail below in conjunction with FIG. 1 to FIG. 11.

Figure 1:
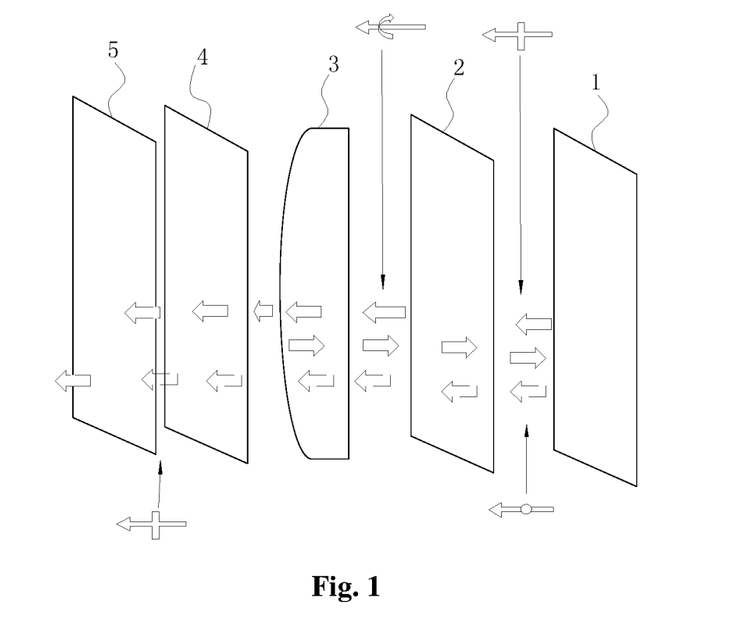
FIG. 1 is a structural representation of a short-distance optical amplification module according to an embodiment of the invention.

FIG. 1 is a structural representation of a short-distance optical amplification module according to an embodiment of the invention. The module includes a reflective type polarizing plate 1, a first phase delay plate 2, an imaging lens 3, a second phase delay plate 4 and an absorptive type polarizing plate 5 that are arranged successively, wherein:

The reflective type polarizing plate 1 is arranged on a transmission path of an optical image having a first linear polarization direction and has a transmission direction consistent with the first linear polarization direction. The first phase delay plate 2 is arranged on the transmission path of the optical image passing through the reflective type polarizing plate and configured for converting the polarization direction of the optical image from the first linear polarization direction to an elliptical or circular polarization direction. The imaging lens 3 is arranged on the transmission path of the optical image having the elliptical or circular polarization direction and includes a second optical surface adjacent to the first phase delay plate and a first optical surface opposite to the second optical surface, the first optical surface being a transflective optical surface, and the imaging lens is configured for amplifying an optical image passing through the first optical surface. The second phase delay plate 4 is arranged on one side of the first optical surface of the imaging lens and configured for converting the polarization direction of the optical image from the elliptical or circular polarization direction to a second linear polarization direction, the second linear polarization direction being orthogonal to the first linear polarization direction. The absorptive type polarizing plate 5 is arranged on one side of the second phase delay plate 4 that faces away from the imaging lens 3, and the absorptive type polarizing plate 5 has a transmission direction consistent with the first linear polarization direction.

The optical image successively passes through the reflective type polarizing plate 1, the first phase delay plate 2, the imaging lens 3, the second phase delay plate 4 and the absorptive type polarizing plate 5. The first phase delay plate 2 is further configured for converting the polarization direction of the optical image reflected by the imaging lens 3 from the elliptical or circular polarization direction to a second linear polarization direction. The reflective type polarizing plate 1 is further configured for reflecting the optical image having the second linear polarization direction that is transmitted by the first phase delay plate 2. The imaging lens 3 is configured for amplifying the optical image reflected back by the reflective type polarizing plate 1. The second phase delay plate 4 is further configured for converting the polarization direction of the amplified optical image to a non-second linear polarization direction, thereby passing the optical image having the non-second linear polarization direction through the absorptive type polarizing plate 5.

It should be noted that, the reflective type polarizing plate 1, the first phase delay plate 2, the second phase delay plate 4 and the absorptive type polarizing plate 5 in this embodiment all belong to the prior art. Each time a polarized light passes through a phase delay plate, a certain angle of phase delay can be added. A reflective type polarizing plate can transmit a linearly-polarized light with a polarization direction consistent with the transmission direction thereof, but totally reflect a linearly-polarized light with a polarization direction orthogonal to the transmission direction thereof, and partially transmit a circularly-polarized light or an elliptically-polarized light with a certain phase delay. By a transflective optical surface, a certain ratio of light may be reflected, and the remaining ratio of light may be transmitted.

In this embodiment, the first optical surface is a curved surface, the second optical surface is a flat surface, and the center of curvature of the first optical surface and the second optical surface are located on the same side of the first optical surface.

The non-second linear polarization direction is preferably the first linear polarization direction.

The operational principle of the short-distance optical amplification module according to the invention will be introduced below.

On the side adjacent to the light source, an optical image having a first linear polarization direction (in this embodiment, the direction parallel to paper direction) passes through the reflective type polarizing plate 1. The reflective type polarizing plate 1 has a transmission direction consistent with the first linear polarization direction. After passing through the reflective type polarizing plate, the optical image passes through the first phase delay plate 2, and then the polarization direction thereof is changed to a phase delayed elliptical polarization direction or circular polarization direction. Especially, when the first phase delay plate 2 is a ¼ wave plate, the polarization direction of the optical image transmitted will be changed to a circular polarization direction after passing through the first phase delay plate 2. Then it passes through the first optical surface of the imaging lens 3, and the light is reflected and amplified with a certain ratio of energy, so that the first-time amplification is accomplished on the optical image, and this amplification is a large amplification. After passing through the second phase delay plate 4, the polarization direction of the optical image reflected will be converted from the elliptical or circular polarization direction to a second linear polarization direction (in this embodiment, vertical to the paper direction). Because the second linear polarization direction is orthogonal to the first linear polarization direction, the optical image having the second linear polarization direction will be totally reflected after reaching the reflective type polarizing plate 1 again, and when the optical image reflected passes through the first phase delay plate 2 for the second time, the polarization direction of the optical image will be converted from the second linear polarization direction to an elliptical or circular polarization direction. Especially, when the first phase delay plate 2 is a ¼ wave plate, the polarization direction of the optical image will be converted to a circular polarization direction after passing through the first phase delay plate 2.

Next, when the optical image totally reflected by the reflective type polarizing plate 1 passes through the imaging lens 3 again, it will be transmitted and amplified on the first optical surface of the imaging lens 3, and this amplification is a small amplification. The optical image after the small amplification passes through the second phase delay plate 4, and the polarization direction thereof is converted to a non-second linear polarization direction (preferably, the first linear polarization direction). Especially, when the second phase delay plate 4 is a ¼ wave plate, the polarization direction of the optical image will be converted to the first linear polarization direction after passing through the second phase delay plate 4 again. Because the absorptive type polarizing plate 5 has a transmission direction consistent with the first linear polarization direction, the optical image having the first linear polarization direction will enter the sight of a viewer after passing through the absorptive type polarizing plate 5, so that large amplification of light may be realized in a short distance (less than 5 cm). In this embodiment, the direction of a polarized light rotated by the first phase delay plate 2 is consistent with that rotated by the second phase delay plate 4 (that is, the first phase delay plate 2 and the second phase delay plate 4 are both left-handed or right-handed phase delay plates).

In the short-distance optical amplification module according to this embodiment, the reflective type polarizing plate is adjacent to the light source side, and a polarized light is reflected for the first time on the imaging lens after passing through the first phase delay plate. The polarized light reflected is reflected for the second time on the reflective type polarizing plate after passing through the first phase delay plate again. The light after being reflected for the second time is then refracted by the imaging lens, and the polarized light refracted enters the sight of a viewer after passing through the second phase delay plate. By the short-distance optical amplification module according to the invention, light is reflected first and refracted finally. Because there is no light loss in the reflection, a light loss resulting from chromatic dispersion of refracted light caused by first refraction and then reflection in an existing short-distance optical amplification module may be avoided, thereby preventing the imaging quality of the light from being affected. Therefore, light may be prevented from returning to the optical display screen, light loss may be lowered, and light utilization and imaging quality may be improved.

In the short-distance optical amplification module according to this technical solution, one side of the imaging lens is the second optical surface, and it is convenient for the second optical surface of the imaging lens to be adhered to the first phase delay plate, thereby reducing the size and volume of the optical module. Additionally, the second optical surface of the imaging lens can further reduce the degree of chromatic dispersion on the curved surface and guarantee the quality of light transmission. In comparison with the first optical surface, the mirror finishing process and process difficulty of the second optical surface will be lower, and the manufacturing cost will be smaller.

In one preferred embodiment, the first phase delay plate 2 and the second phase delay plate 4 are both ¼ wave plates so as to guarantee that the optical image is totally reflected when reaching the reflective type polarizing plate 1 for the second time. That is, at this moment, the polarization direction of the optical image is converted to a second linear polarization direction orthogonal to the first linear polarization direction.

Additionally, in order to guarantee that the polarized light transmitted through the first optical surface of the imaging lens for the first time is totally absorbed when reaching the absorptive type polarizing plate 5, the optical path difference of the optical image after passing through the first phase delay plate 2 and the second phase delay plate $$4 \text{ is } \frac{1}{2}, 1\frac{1}{2}, 2\frac{1}{2} LLn\frac{1}{2},$$

wherein n is an integer, and the ½ represents an integer.

Wherein, as limited by the manufacture or production process, the optical path difference of a polarized light after passing through the first phase delay plate 2 and the second phase delay plate 4 has an adjustable range, of which a preferred value is 0.3-0.7.

In this embodiment, the absorptive type polarizing plate 5 is configured for absorbing the light from the outside and preventing the interference of the ambient light on the display, thereby further improving the imaging quality.

Figure 3:
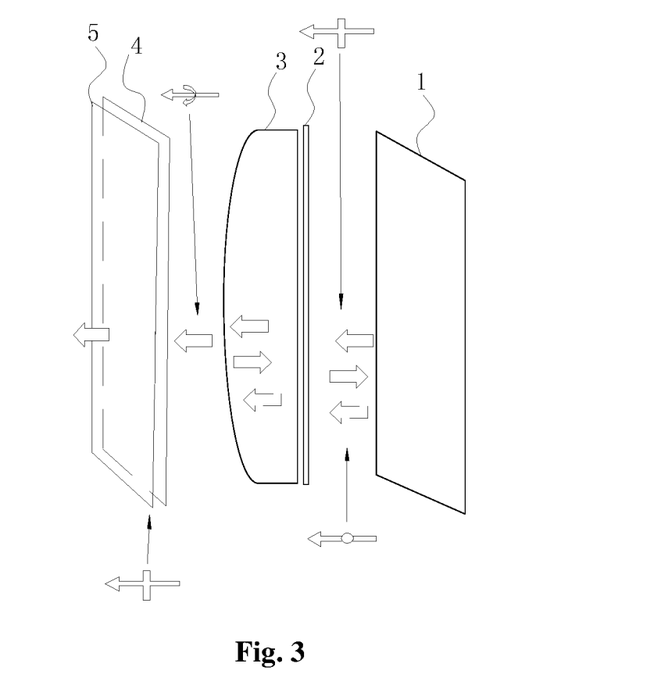
FIG. 3 is a structural representation of another short-distance optical amplification module according to an embodiment of the invention.

In another optimized solution of the above example, as shown in FIG. 3, in order to further reduce the size and volume of the optical module, the second optical surface of the imaging lens 3 is adhered to the first phase delay plate 2, and the second phase delay plate 4 is adhered to the absorptive type polarizing plate 5, wherein, said adhering includes affixing or moving to make the gap between two optical components small enough. However, none of these adhering measures will affect the propagation of the optical path in the short-distance optical module.

Figure 4:
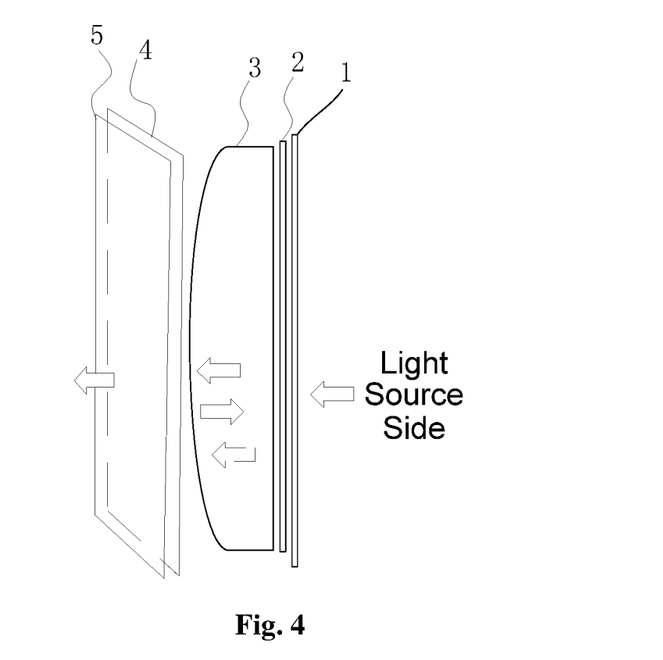
FIG. 4 is a structural representation of yet another short-distance optical amplification module according to an embodiment of the invention.

Additionally, as shown in FIG. 4, in order to further reduce the size of the optical module, the first optical surface of the imaging lens 3 is adhered to the second phase delay plate 4, and the reflective type polarizing plate 1 is adhered to the first phase delay plate 2.

Figure 5:
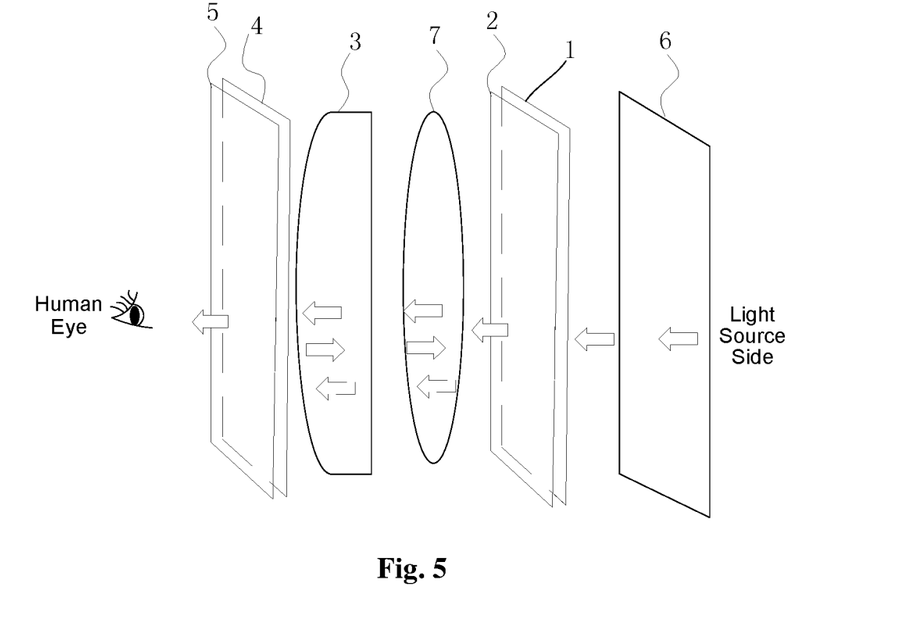
FIG. 5 is a structural representation of yet another short-distance optical amplification module according to an embodiment of the invention.

In another practicable embodiment, when the short-distance optical amplification module in the above embodiments is applied to a near-eye display optical device (for example, VR glasses), as shown in FIG. 5, the module further includes an optical display screen 6 configured for generating an optical image having a first linear polarization direction. The optical display screen 6 is arranged on one side of the reflective type polarizing plate 1 that faces away from the first phase delay plate 2.

In this embodiment, by adding an optical display screen, the short-distance optical amplification module can realize optical imaging. When the short-distance optical amplification module is applied to VR glasses, the size and volume of the VR glasses will be smaller than the existing VR glasses, the weight will be lighter, and it will be more comfortable to wear.

The short-distance optical amplification module according to the invention is further provided with an optical device 7 that does not affect phase delay. The optical device 7 is arranged between any adjacent two of the reflective type polarizing plate 1, the first phase delay plate 2, the imaging lens 3, the second phase delay plate 4 and the absorptive type polarizing plate 5. In FIG. 5, the optical device 7 is arranged between the first phase delay plate 2 and the imaging lens 3, and the optical device 7 is arranged coaxially with the reflective type polarizing plate, the first phase delay plate, the imaging lens, the second phase delay plate and the absorptive type polarizing plate.

In the short-distance optical amplification module according to this embodiment, by arranging the optical device, the practicability and flexibility of the short-distance optical amplification module can be improved, so that the short-distance optical amplification module according to the invention can be applicable to different optical devices and apparatuses.

In another preferred embodiment, in order to lower the light loss and improve the light utilization, the curvature radius of the first optical surface of the imaging lens 3 in the above embodiments is 100 mm or −100 mm. Additionally, in order to strengthen the projection effect of the polarized light, the range of transmittance of the imaging lens 3 is 0.2 to 0.8.

Figure 6:
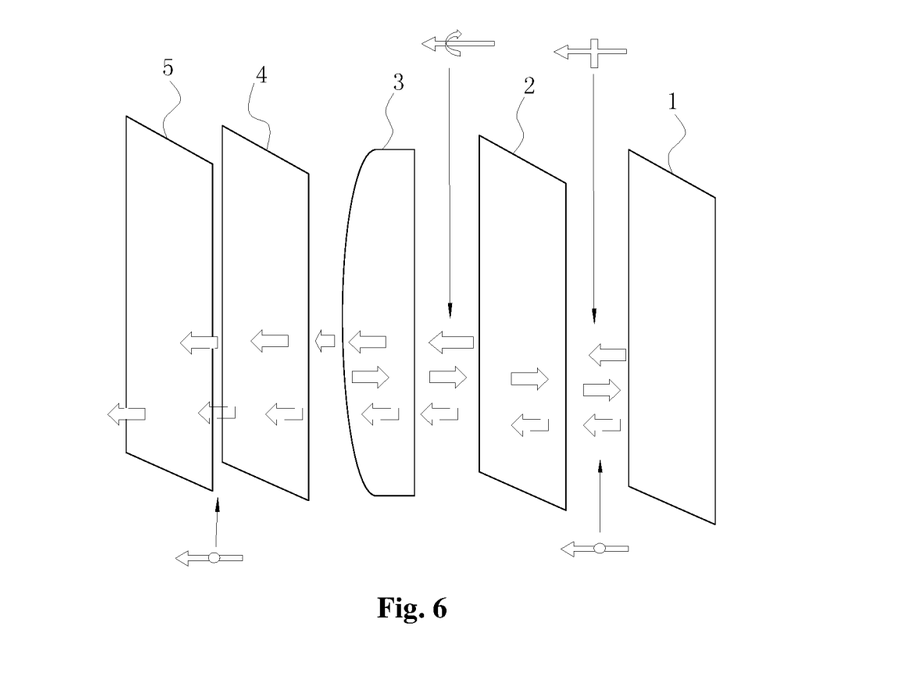
FIG. 6 is a structural representation of yet another short-distance optical amplification module according to an embodiment of the invention.

Additionally, as shown in FIG. 6, the invention further provides another short-distance optical amplification module. In comparison with the above embodiments, the short-distance optical amplification module of this embodiment differs only as follows.

In this embodiment, the direction of a polarized light rotated by the first phase delay plate 2 is opposite to that rotated by the second phase delay plate 4 (that is, when the first phase delay plate 2 has a left-handed rotation direction, the second phase delay plate 4 will have a right-handed rotation direction, or, when the first phase delay plate 2 has a right-handed rotation direction, the second phase delay plate 4 will have a left-handed rotation direction). Correspondingly, in this embodiment, the absorptive type polarizing plate 5 has a transmission direction orthogonal to the second linear polarization direction, the second linear polarization direction being orthogonal to the first linear polarization direction. The second phase delay plate 5 is arranged on one side of the first optical surface of the imaging lens 4 and configured for converting the polarization direction of the optical image from the elliptical or circular polarization direction to the first linear polarization direction or the second linear polarization direction.

The optical image successively passes through the reflective type polarizing plate 1, the first phase delay plate 2, the imaging lens 3, the second phase delay plate 4 and the absorptive type polarizing plate 5. The first phase delay plate 2 is further configured for converting the polarization direction of the optical image reflected by the imaging lens 3 from the elliptical or circular polarization direction to a second linear polarization direction. The reflective type polarizing plate 1 is further configured for reflecting the optical image having the second linear polarization direction that is transmitted by the first phase delay plate 2. The imaging lens 3 is configured for amplifying the optical image reflected back by the reflective type polarizing plate 1. The second phase delay plate 4 is further configured for converting the polarization direction of the amplified optical image to a non-first linear polarization direction, thereby passing the optical image having the non-first linear polarization direction through the absorptive type polarizing plate 5.

The non-first linear polarization direction is preferably the second linear polarization direction.

Figure 7:
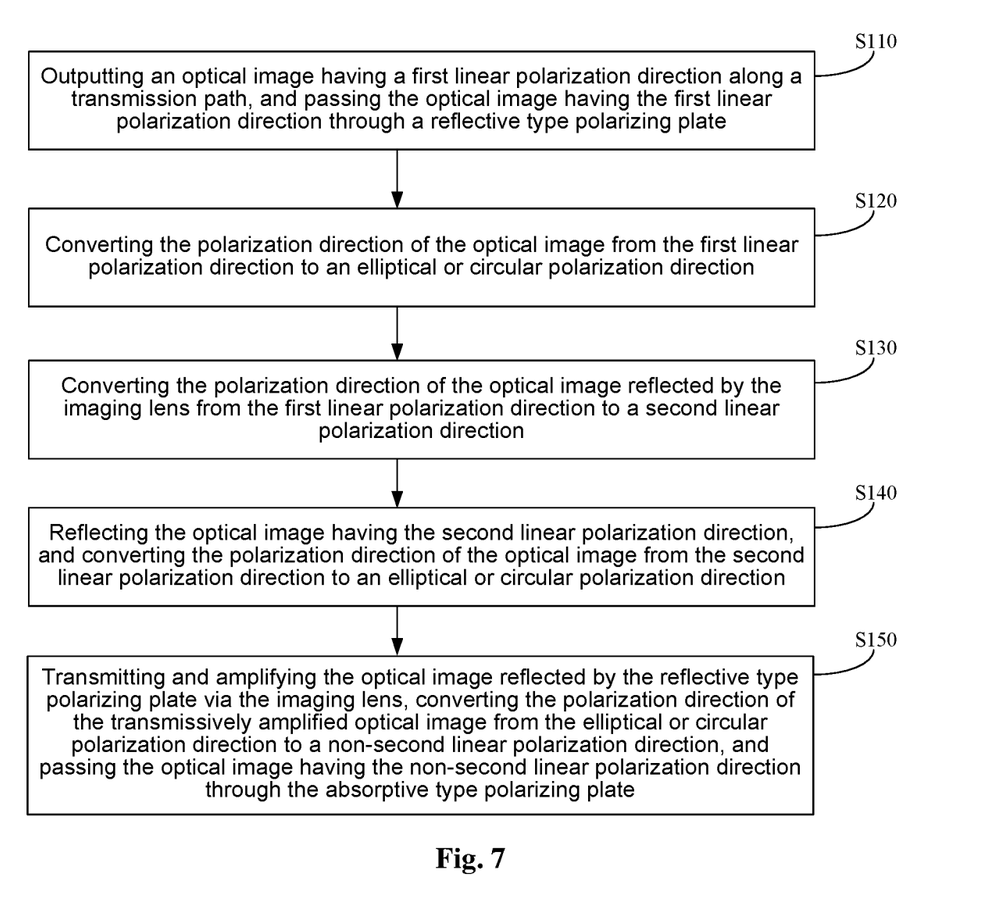
FIG. 7 is a flow chart of a short-distance optical amplification method according to an embodiment of the invention.

As shown in FIG. 7, this embodiment provides a short-distance optical amplification method, which corresponds to the above short-distance optical amplification module, wherein the method includes the steps below.

Step S110: an optical image having a first linear polarization direction is output along a transmission path, and the optical image having the first linear polarization direction is passed through a reflective type polarizing plate, wherein the reflective type polarizing plate has a transmission direction consistent with the first linear polarization direction.

Step S120: the polarization direction of the optical image is converted from the first linear polarization direction to an elliptical or circular polarization direction, and the optical image is reflected and amplified via an imaging lens.

Step S130: the polarization direction of the optical image reflected by the imaging lens is converted from the first linear polarization direction to a second linear polarization direction, the second linear polarization direction being orthogonal to the first linear polarization direction.

Step S140: the optical image having the second linear polarization direction is reflected by the reflective type polarizing plate, and the polarization direction of the optical image is converted from the second linear polarization direction to an elliptical or circular polarization direction.

Step S150: the optical image reflected by the reflective type polarizing plate is transmitted and amplified via the imaging lens, the polarization direction of the transmitted and amplified optical image is converted from the elliptical or circular polarization direction to a non-second linear polarization direction, and the optical image having the non-second linear polarization direction is passed through the absorptive type polarizing plate.

In the short-distance optical amplification method according to the invention, based on the amplification principle of the above short-distance optical amplification module, very large amplification is produced in a small overall optical channel by making full use of the large angle (relative to the small angle variation of transmission) adjustment feature of a reflective optical module, thus a large visual angle effect can be realized for a minitype screen. Considering the low sensitivity on the overall brightness loss in near eye optics, a mode of discarding a part of the energy of an imaging lens is employed in the overall optical design in the invention, without apparently affecting the final display effect. Therefore, a near eye display optical module with high amplification, small overall thickness and almost no phase difference is realized in the invention.

In the short-distance optical amplification method according to this embodiment, by employing a short-distance optical amplification module, an optical image is reflected first and refracted finally, a light loss resulting from chromatic dispersion of refracted light caused by first refraction and then reflection in an existing short-distance optical amplification module may be avoided, thereby preventing the imaging quality of the light from being affected.

Figure 8:
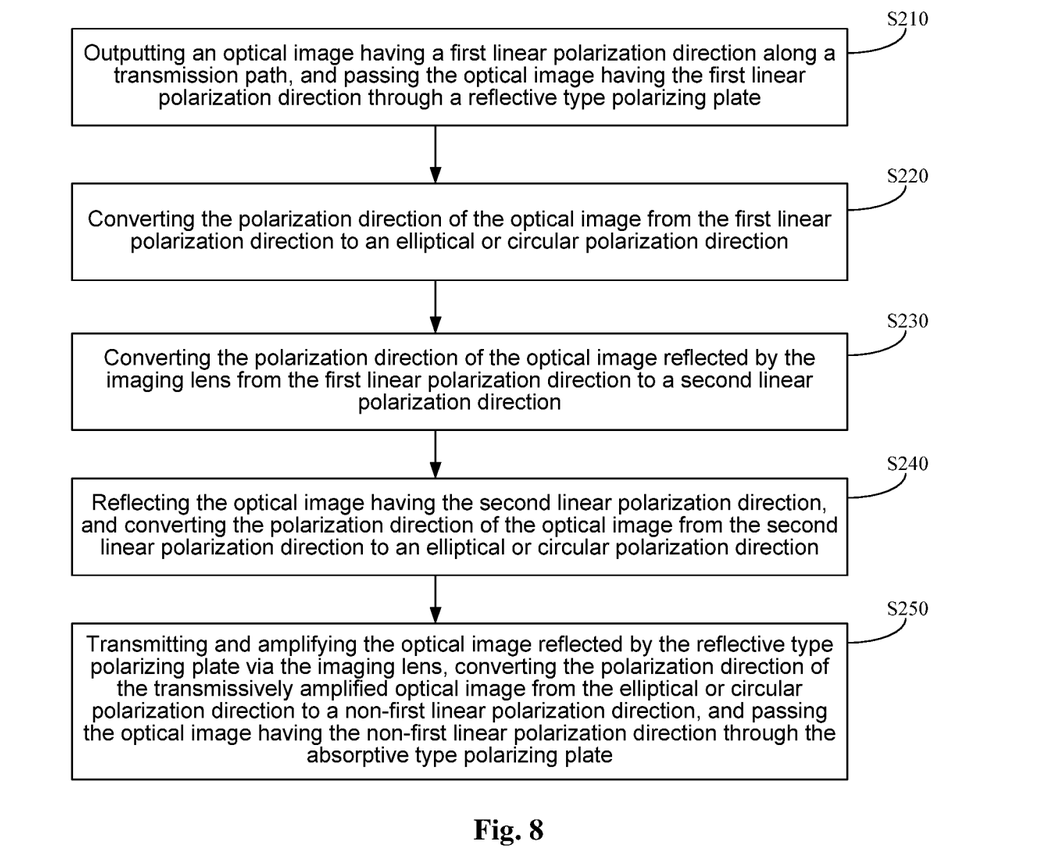
FIG. 8 is a flow chart of another short-distance optical amplification method according to an embodiment of the invention.

Additionally, as shown in FIG. 8, corresponding to the short-distance optical amplification module in FIG. 6, the invention further provides another short-distance optical amplification method, which includes the steps as below.

Step S210: an optical image having a first linear polarization direction is output along a transmission path, and the optical image having the first linear polarization direction is passed through a reflective type polarizing plate, wherein the reflective type polarizing plate has a transmission direction consistent with the first linear polarization direction.

Step S220: the polarization direction of the optical image is converted from the first linear polarization direction to an elliptical or circular polarization direction, and the optical image is reflected and amplified via the optical image.

Step S230: the polarization direction of the optical image reflected by the imaging lens is converted from the first linear polarization direction to a second linear polarization direction, the second linear polarization direction being orthogonal to the first linear polarization direction.

Step S240: the optical image having the second linear polarization direction is reflected by the reflective type polarizing plate, and the polarization direction of the optical image is converted from the second linear polarization direction to an elliptical or circular polarization direction.

Step S250: the optical image reflected by the reflective type polarizing plate is transmitted and amplified via the imaging lens, the polarization direction of the transmitted and amplified optical image is converted from the elliptical or circular polarization direction to a non-first linear polarization direction, and the optical image having the non-first linear polarization direction is passed through the absorptive type polarizing plate.

Figure 9:
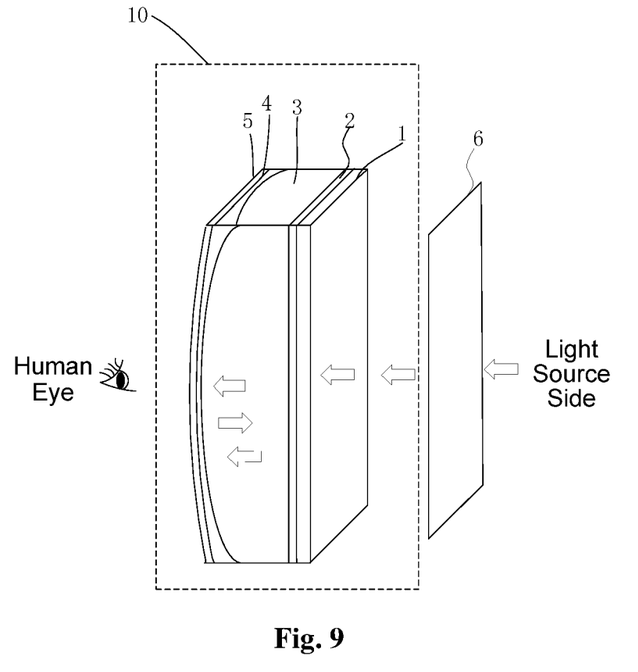
FIG. 9 is a structural representation of yet another short-distance optical amplification system according to an embodiment of the invention.

The invention further provides a short-distance optical amplification system. As shown in FIG. 9, the system includes a short-distance optical amplification module 10, and an optical display screen 6 configured for generating an optical image having a first linear polarization direction, wherein, the short-distance optical amplification module 10 includes:

a reflective polarization layer 1, which is arranged on a transmission path of an optical image having a first linear polarization direction and has a transmission direction consistent with the first linear polarization direction; a first phase delay layer 2, which is arranged on the transmission path of the optical image passing through the reflective polarization layer and configured for converting the polarization direction of the optical image from the first linear polarization direction to an elliptical or circular polarization direction; a imaging lens layer 3, which is arranged on the transmission path of the optical image having the elliptical or circular polarization direction and includes a second optical surface adjacent to the first phase delay layer and a first optical surface opposite to the second optical surface, the first optical surface being a transflective optical surface, and the imaging lens is configured for amplifying an optical image passing through the first optical surface; a second phase delay layer 4, which is arranged on one side of the first optical surface of the imaging lens layer and configured for converting the polarization direction of the optical image from the elliptical or circular polarization direction to a second linear polarization direction, the second linear polarization direction being orthogonal to the first linear polarization direction; and an absorptive polarization layer 5, which is arranged on one side of the second phase delay layer that faces away from the imaging lens and has a transmission direction consistent with the first linear polarization direction.

The optical image successively passes through the reflective polarization layer 1, the first phase delay layer 2, the imaging lens layer 3, the second phase delay layer 4 and the absorptive polarization layer 5. The reflective polarization layer 1 is configured for reflecting the optical image having the second linear polarization direction that is transmitted by the first phase delay layer. The imaging lens layer 3 is configured for reflecting and amplifying the optical image reflected back by reflective polarization layer 1. The second phase delay layer 4 is further configured for converting the polarization direction of the amplified optical image to a non-second linear polarization direction, thereby passing the optical image having the non-second linear polarization direction through the absorptive polarization layer.

The optical display screen 6 is arranged on one side of the short-distance optical amplification module 10 that is adjacent to the reflective polarization layer 1.

The structural positions and functions of the reflective polarization layer, the first phase delay layer, the imaging lens layer and the second phase delay layer in the short-distance optical amplification system according to this embodiment are respectively the same as the structural positions and functions of the reflective type polarizing plate, the first phase delay plate, the imaging lens and the second phase delay plate of the above example, and the transmission process of the optical image in the short-distance optical amplification module 10 is also the same as that in the above short-distance optical amplification module. The difference lies in that: in this embodiment, the short-distance optical amplification module is a multilayer optical structure consisted of a reflective polarization layer, a first phase delay layer, an imaging lens layer and a second phase delay layer, and the size and volume of the optical amplification module are greatly reduced without affecting the optical imaging quality, the weight is reduced, and the comfortableness of wearing VR glasses employing the optical amplification component is improved.

The short-distance optical amplification system in the above embodiment further includes an optical device 7 that does not affect phase delay. The optical device 7 is arranged between the short-distance optical amplification module and the optical display screen. The optical device 7 includes a near-sighted lens, a far-sighted lens or an astigmatic lens, etc. Additionally, in order to further reduce the size and volume of the optical component, the optical device 7 may be adhered to the short-distance optical amplification module 10 without affecting the optical path.

Figure 10:
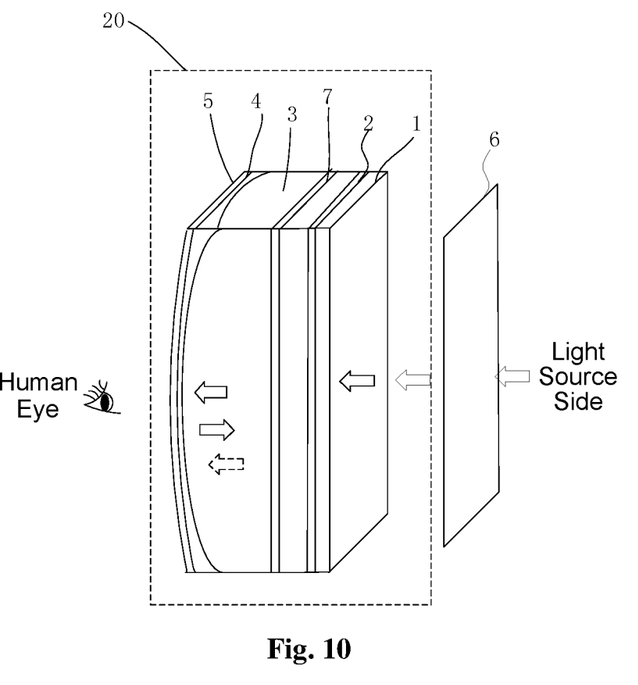
FIG. 10 is a structural representation of yet another short-distance optical amplification system according to an embodiment of the invention.

In another preferred embodiment, the short-distance optical amplification module 10 of the short-distance optical amplification system further includes an optical device layer 7 that does not affect phase delay. The optical device layer 7 is arranged between any two of the reflective polarization layer, the first phase delay layer, the imaging lens layer, the second phase delay layer and the absorptive polarization layer. Preferably, as shown in FIG. 10, the optical device layer 7 is arranged between the first phase delay layer 2 and the imaging lens layer 3.

In the short-distance optical amplification system according to the technical solutions of the invention, an optical device that does not affect phase delay is added, and because the position of the optical device may be arranged freely, the practicability of the short-distance optical amplification system may be further improved without affecting the transmission of the optical image.

Additionally, the invention further provides another short-distance optical amplification system, which includes: a short-distance optical amplification module 10, and an optical display screen 6 configured for generating an optical image having a first linear polarization direction, wherein the short-distance optical amplification module 10 includes:

a reflective polarization layer 1, which is arranged on a transmission path of an optical image having a first linear polarization direction and has a transmission direction consistent with the first linear polarization direction;

a first phase delay layer 2, which is arranged on a transmission path of an optical image passing through the reflective polarization layer 1 and configured for converting the polarization direction of the optical image from the first linear polarization direction to an elliptical or circular polarization direction;

an imaging lens layer 3, which is arranged on the transmission path of the optical image having the elliptical or circular polarization direction and includes a second optical surface adjacent to the first phase delay layer 2 and a first optical surface of opposite to the second optical surface, the first optical surface being a transflective optical surface, and the imaging lens layer is configured for amplifying an optical image passing through the first optical surface;

a second phase delay layer 4, which is arranged on one side of the first optical surface of the imaging lens layer 3 and configured for converting the polarization direction of the optical image from the elliptical or circular polarization direction to the first linear polarization direction; and an absorptive polarization layer 5, which is arranged on one side of the second phase delay layer 4 that faces away from the imaging lens layer 3 and has a transmission direction consistent with a second linear polarization direction, the second linear polarization direction being orthogonal to the first linear polarization direction;

wherein, the optical image successively passes through the reflective polarization layer, the first phase delay layer, the imaging lens layer, the second phase delay layer and the absorptive polarization layer, and the first phase delay layer is further configured for converting the polarization direction of the optical image reflected by the imaging lens layer from the elliptical or circular polarization direction to a second linear polarization direction, the reflective polarization layer is configured for reflecting the optical image having the second linear polarization direction that is transmitted by the first phase delay layer, the imaging lens layer is configured for reflecting and amplifying the optical image reflected by the reflective polarization layer, and the second phase delay layer is further configured for converting the polarization direction of the amplified optical image to a non-first linear polarization direction, thereby passing the optical image having the non-first linear polarization direction through the absorptive polarization layer.

Figure 11:
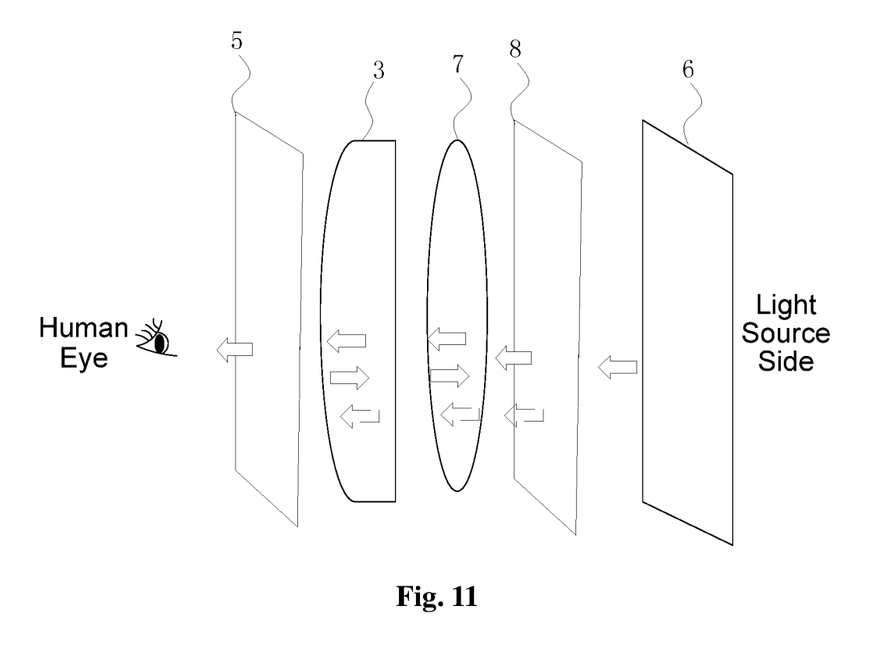
FIG. 11 is a structural representation of yet another short-distance optical amplification module according to an embodiment of the invention.

This solution further provides another short-distance optical amplification module. As shown in FIG. 11, the module includes a reflective type polarizing plate 8, an imaging lens 3 and an absorptive type polarizing plate 5 that are arranged successively. The reflective type polarizing plate 8 includes a first side and a second side opposite to the first side. The first side transmits light, and the second side reflects light. The second side is adjacent to the imaging lens. One of the two sides of the imaging lens 3 is the second optical surface, and the other side opposite to the second optical surface is the first optical surface, and the side of the first optical surface is adjacent to the absorptive type polarizing plate 5.

It should be noted that, the imaging lens 3 and the absorptive type polarizing plate 5 are the same as those of the above embodiments. The difference lies in that the reflective type polarizing plate 8 has a unidirectional reflection function. That is, when light is emitted into the reflective type polarizing plate from one side, it will pass through the reflective type polarizing plate 8 without being reflected; however, when light is emitted from the other side of the reflective type polarizing plate 8, it will be totally reflected, just like the unilateral conductivity of a diode. For convenience, the side of the reflective type polarizing plate on which only transmission occurs is defined as the first side, and the side of the reflective type polarizing plate on which only reflection occurs is defined as the second side. Additionally, one of the two sides of the imaging lens 3 is a flat surface, and the other side is a curved surface, and the curved surface is adjacent to the absorptive type polarizing plate 5. The two sides of the absorptive type polarizing plate 5 are both flat surfaces.

In this embodiment of the invention, the unidirectional reflectivity of the reflective type polarizing plate is employed, replacing the first phase delay plate and the second phase delay plate in the design of the short-distance optical amplification module. When an orthogonal polarized light passes through the reflective type polarizing plate 8, it will not be reflected. Next, when the polarized light passes through the curved surface of the imaging lens 3, it will be reflected for the first time. When the polarized light reflected reaches the reflective type polarizing plate 8 again, it will be totally reflected for the second time. When the polarized light totally reflected for the second time passes through the curved surface of the imaging lens 3, it will be transmitted and enter the sight of a viewer. By the optical amplification module according to this embodiment, the space of the phase delay plate may be saved, and the size and volume of the optical module may be further reduced.

Preferably, the short-distance optical amplification module according to this embodiment further includes: an optical display screen 6, and an optical device 7 that does not affect phase delay. The optical display screen 6 is arranged on one side of the reflective type polarizing plate 8 that faces away from the imaging lens 3. The optical device 7 may be arranged between any two of the optical display screen 6, the reflective type polarizing plate 8, the imaging lens 3 and the absorptive type polarizing plate 5. The position of the optical device may also be arranged autonomously as required, and hence the practicability and flexibility of the optical module may be further improved.

In order to further reduce the size and volume of the optical module, the optical display screen 6 may be adhered to the reflective type polarizing plate 8, the reflective type polarizing plate 8 may be adhered to the imaging lens 3, and the imaging lens 3 may be adhered to the absorptive type polarizing plate 5.

Additionally, in the above embodiments, the imaging lens 3 or the imaging lens layer may be a 50% transmissive and 50% reflective curved lens.

It should be noted that, relational terms such as "first" and "second" employed herein are only used for distinguishing one entity or operation from another entity or operation, rather than requiring or implying that these entities or operations have such a practical relation or sequence. Moreover, the terms "include", "comprise" or any variations thereof intend to encompass nonexclusive inclusion, so that a process, a method, an object or a device that are said to include a series of essential factors not only include such essential factors, but also include other essential factors that are not listed specifically or essential factors inherent in such a process, method, object or device. In the case of no other limitation, an essential factor defined by a sentence "includes a . . . " does not exclude that additional similar essential factors exist in the process, method, object or device that includes said essential factor.

The above description only shows some specific embodiments of the invention for one skilled in the art to understand or implement the invention. Various modifications to these embodiments are apparent to those skilled in the art. The general principles defined herein may be implemented in other embodiments without departing from the spirit or scope of the invention. Therefore, the invention will not be limited to the embodiments described herein; instead, the invention conforms to the widest scope that is consistent with the principles and novel features disclosed herein.

What is claimed is:

1. A short-distance optical amplification module, comprising: a reflective type polarizing plate, a first phase delay plate, an imaging lens, a second phase delay plate and an absorptive type polarizing plate that are arranged successively, wherein:

the reflective type polarizing plate is arranged on a transmission path of an optical image having a first linear polarization direction and has a transmission direction consistent with the first linear polarization direction;

the first phase delay plate is arranged on the transmission path of the optical image passing through the reflective type polarizing plate and configured for converting the polarization direction of the optical image from the first linear polarization direction to an elliptical or circular polarization direction;

the imaging lens is arranged on the transmission path of the optical image having the elliptical or circular polarization direction and comprises a second optical surface adjacent to the first phase delay plate and a first optical surface opposite to the second optical surface, the first optical surface being a transflective optical surface, and the imaging lens is configured for amplifying the optical image passing through the first optical surface;

the second phase delay plate is arranged on one side of the first optical surface of the imaging lens and configured for converting the polarization direction of the optical image from the elliptical or circular polarization direction to a second linear polarization direction, the second linear polarization direction being orthogonal to the first linear polarization direction; and the absorptive type polarizing plate is arranged on one side of the second phase delay plate that faces away from the imaging lens and has a transmission direction consistent with the second linear polarization direction;

wherein, the optical image successively passes through the reflective type polarizing plate, the first phase delay plate, the imaging lens, the second phase delay plate and the absorptive type polarizing plate, and the first phase delay plate is further configured for converting the polarization direction of the optical image reflected by the imaging lens from the elliptical or circular polarization direction to the second linear polarization direction, the reflective type polarizing plate is configured for reflecting the optical image having the second linear polarization direction transmitted by the first phase delay plate, the imaging lens is configured for amplifying the optical image reflected by the reflective type polarizing plate, and the second phase delay plate is further configured for converting the polarization direction of the amplified optical image to the second linear polarization direction, thereby passing the optical image having the second linear polarization direction through the absorptive type polarizing plate.

2. The module according to claim 1, wherein, the first phase delay plate and the second phase delay plate are both ¼ wave plates.

3. The module according to claim 1, wherein, the second optical surface of the imaging lens is adhered to the first phase delay plate, and the second phase delay plate is adhered to the absorptive type polarizing plate.

4. The module according to claim 3, wherein, the first optical surface of the imaging lens is adhered to the second phase delay plate.

5. The module according to claim 4, wherein, the reflective type polarizing plate is adhered to the first phase delay plate.

6. The module according to claim 5, further comprising: an optical display screen configured for generating an optical image having the first linear polarization direction, wherein the optical display screen is arranged on one side of the reflective type polarizing plate that faces away from the first phase delay plate.

7. A short-distance optical amplification method, comprising the steps of:
outputting an optical image having a first linear polarization direction along a transmission path, and passing the optical image having the first linear polarization direction through a reflective type polarizing plate, wherein the reflective type polarizing plate has a transmission direction consistent with the first linear polarization direction;
converting the polarization direction of the optical image from the first linear polarization direction to an elliptical or circular polarization direction, and reflecting and amplifying the optical image via an imaging lens;
converting the polarization direction of the optical image reflected by the imaging lens from the elliptical or circular polarization direction to a second linear polarization direction, the second linear polarization direction being orthogonal to the first linear polarization direction;
reflecting the optical image having the second linear polarization direction by the reflective type polarizing plate, and converting the polarization direction of the optical image from the second linear polarization direction to an elliptical or circular polarization direction;
transmitting and amplifying, via the imaging lens, the optical image reflected by the reflective type polarizing plate, converting the polarization direction of the transmitted and amplified optical image from the elliptical or circular polarization direction to a non-first linear polarization direction, and passing the optical image having the non-first linear polarization direction through an absorptive type polarizing plate.

8. A short-distance optical amplification system, comprising: a short-distance optical amplification module, and an optical display screen configured for generating an optical image having a first linear polarization direction, wherein, the short-distance optical amplification module comprises:
a reflective polarization layer, which is arranged on a transmission path of an optical image having a first linear polarization direction and has a transmission direction consistent with the first linear polarization direction;
a first phase delay layer, which is arranged on the transmission path of the optical image passing through the reflective polarization layer and configured for converting the polarization direction of the optical image from the first linear polarization direction to an elliptical or circular polarization direction;
an imaging lens layer, which is arranged on the transmission path of the optical image having the elliptical or circular polarization direction and comprises a second optical surface adjacent to the first phase delay layer and a first optical surface opposite to the second optical surface, the first optical surface being a transflective optical surface, and the imaging lens is configured for amplifying the optical image passing through the first optical surface;
a second phase delay layer, which is arranged on one side of the first optical surface of the imaging lens layer and configured for converting the polarization direction of the optical image from the elliptical or circular polarization direction to a second linear polarization direction, the second linear polarization direction being orthogonal to the first linear polarization direction; and
an absorptive polarization layer, which is arranged on one side of the second phase delay layer that faces away from the imaging lens layer and has a transmission direction consistent with the first linear polarization direction;
wherein, the optical image successively passes through the reflective polarization layer, the first phase delay layer, the imaging lens layer, the second phase delay layer and the absorptive polarization layer, and the first phase delay layer is further configured for converting the polarization direction of the optical image reflected by the imaging lens layer from the elliptical or circular polarization direction to the second linear polarization direction, the reflective polarization layer is configured for reflecting the optical image having the second linear polarization direction that is transmitted by the first phase delay layer, the imaging lens layer is configured for reflecting and amplifying the optical image reflected by the reflective polarization layer, and the second phase delay layer is further configured for converting the polarization direction of the amplified optical image to a non-second linear polarization direction, thereby passing the optical image having the non-second linear polarization direction through the absorptive polarization layer.

9. A short-distance optical amplification system, comprising: a short-distance optical amplification module, and an optical display screen configured for generating an optical image having a first linear polarization direction, wherein, the short-distance optical amplification module comprises:
a reflective polarization layer, which is arranged on a transmission path of an optical image having a first linear polarization direction and has a transmission direction consistent with the first linear polarization direction;
a first phase delay layer, which is arranged on the transmission path of the optical image passing through the reflective polarization layer and configured for converting the polarization direction of the optical image from the first linear polarization direction to an elliptical or circular polarization direction;
an imaging lens layer, which is arranged on the transmission path of the optical image having the elliptical or circular polarization direction and comprises a second optical surface adjacent to the first phase delay layer and a first optical surface opposite to the second optical surface, the first optical surface being a transflective optical surface, and is configured for amplifying the optical image passing through the first optical surface;
a second phase delay layer, which is arranged on one side of the first optical surface of the imaging lens layer and configured for converting the polarization direction of the optical image from the elliptical or circular polarization direction to the first linear polarization direction; and
an absorptive polarization layer, which is arranged on one side of the second phase delay layer that faces away from the imaging lens layer and has a transmission direction consistent with a second linear polarization direction, the second linear polarization direction being orthogonal to the first linear polarization direction;

wherein, the optical image successively passes through the reflective polarization layer, the first phase delay layer, the imaging lens layer, the second phase delay layer and the absorptive polarization layer, and the first phase delay layer is further configured for converting the polarization direction of the optical image reflected by the imaging lens layer from the elliptical or circular polarization direction to the second linear polarization direction, the reflective polarization layer is configured for reflecting the optical image having the second linear polarization direction that is transmitted by the first phase delay layer, the imaging lens layer is configured for reflecting and amplifying the optical image reflected by the reflective polarization layer, and the second phase delay layer is further configured for converting the polarization direction of the amplified optical image to a non-first linear polarization direction, thereby passing the optical image having the non-first linear polarization direction through the absorptive polarization layer.

10. The system according to claim 9, further comprising: an optical device that does not affect phase delay, wherein the optical device is arranged between the short-distance optical amplification module and the optical display screen.

11. The system according to claim 10, wherein, the short-distance optical amplification module further comprises an optical device layer that does not affect phase delay, wherein the optical device layer is arranged between any two of the reflective polarization layer, the first phase delay layer, the imaging lens layer, the second phase delay layer and the absorptive polarization layer.

12. The system according to claim 9, wherein, the short-distance optical amplification module further comprises an optical device layer that does not affect phase delay, wherein the optical device layer is arranged between any two of the reflective polarization layer, the first phase delay layer, the imaging lens layer, the second phase delay layer and the absorptive polarization layer.

* * * * *